ation or applications, and is not to be construed as a limitation on the scope of the claimed subject matter.

United States Patent [19]
Ridenour

[11] 4,200,314
[45] Apr. 29, 1980

[54] TUBE FITTING ASSEMBLY

[76] Inventor: Ralph G. Ridenour, 626 Lexington-Ontario Rd., Mansfield, Ohio 44903

[21] Appl. No.: 527,683

[22] Filed: Nov. 27, 1974

Related U.S. Application Data

[62] Division of Ser. No. 425,561, Dec. 17, 1973, abandoned.

[51] Int. Cl.² ............................................. F16L 13/14
[52] U.S. Cl. .................................. 285/382.5; 29/523
[58] Field of Search .................. 285/382.5, 382.4, 258, 285/382, 382.1, 382.2; 29/523, 522

[56] References Cited

U.S. PATENT DOCUMENTS

| 528,168 | 10/1894 | Jones | 285/382.5 X |
|---|---|---|---|
| 1,533,886 | 4/1925 | Mueller et al. | 285/382.5 X |
| 1,776,615 | 9/1930 | Boothman et al. | 285/382 X |
| 1,858,136 | 5/1932 | Brenner | 285/382.5 X |
| 2,434,080 | 1/1948 | Rosa | 403/282 X |
| 2,463,883 | 3/1949 | Kinsey | 285/382.5 X |
| 2,477,676 | 8/1949 | Woodling | 285/382.5 X |
| 3,497,946 | 3/1970 | Tingley | 285/382.5 X |
| 3,711,132 | 1/1973 | Nickerson | 285/382.4 |
| 3,778,090 | 12/1973 | Tobin | 285/382.5 X |
| 3,787,945 | 1/1974 | Pasek et al. | 285/382.5 X |
| 3,817,562 | 6/1974 | Cook et al. | 285/382.5 X |
| 3,940,168 | 2/1976 | Balon | 285/132 |
| 3,942,825 | 3/1976 | Balon | 285/132 |

FOREIGN PATENT DOCUMENTS 688579  3/1953  United Kingdom .................. 285/382.5

*Primary Examiner*—Thomas F. Callaghan
*Attorney, Agent, or Firm*—Pearne, Gordon, Sessions

[57] ABSTRACT

A tube fitting assembly is disclosed comprising a fitting having a first bore through a portion of the fitting and a second bore larger than the first bore and concentric with and through a portion of the first bore. A tubing having a diameter substantially equal to the first bore engages an inside surface of the fitting defined by the end of the first bore. Relative movement between the fitting and the tube deforms the tubing wall to engage the first and second bores and to form an annular bead of the tubing wall outside of the fitting assembly. The bead is swaged into engagement with an outside surface of the fitting surrounding the second bore. The foregoing is merely a resumé of one general application, is not a complete discussion of all principles of operation or applications, and is not to be construed as a limitation on the scope of the claimed subject matter.

14 Claims, 6 Drawing Figures

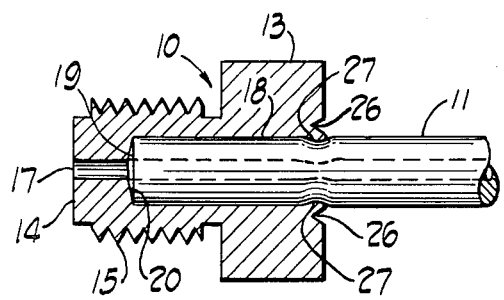
Fig. 1
PRIOR ART
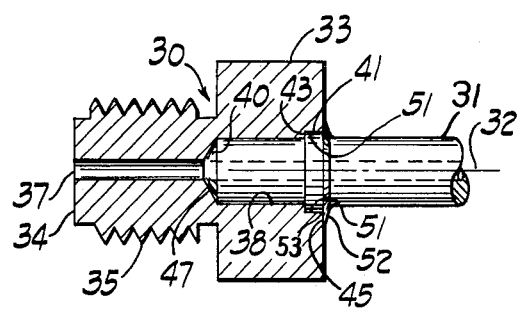
Fig. 2
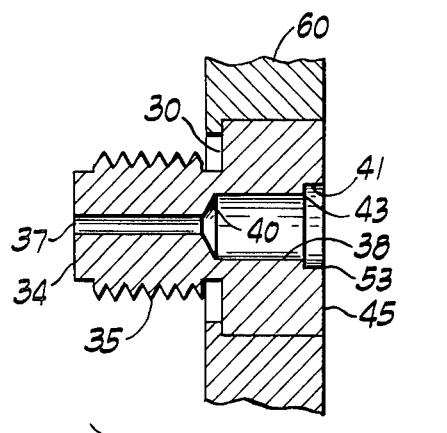
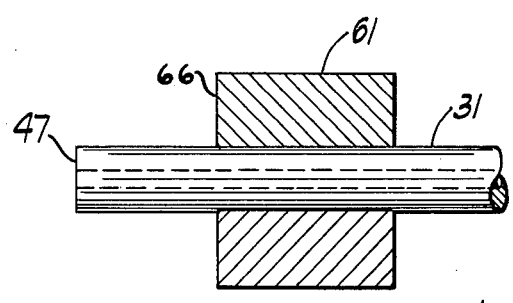
Fig. 3
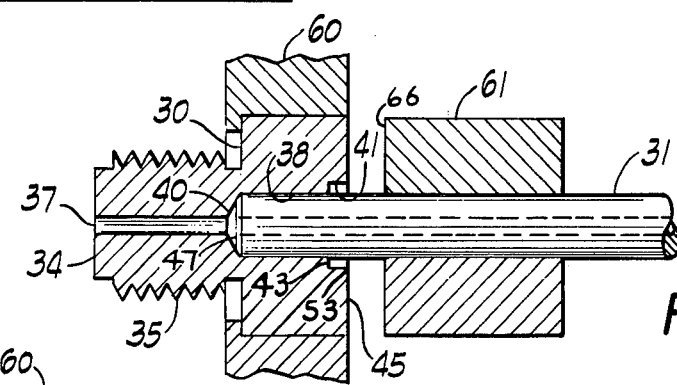
Fig. 4
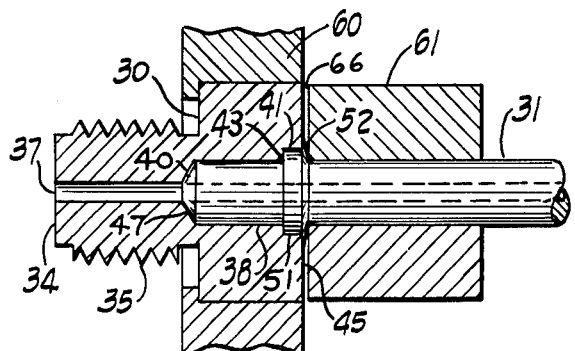
Fig. 5     Fig. 6

TUBE FITTING ASSEMBLY

This is a division of application Ser. No. 425,561, filed Dec. 17, 1973, and now abandoned.

BACKGROUND OF THE INVENTION

1. Field of the Invention

This invention relates to metalworking and more particularly to a mechanical process by flaring an inserted tube end or expanding a part in an aperture or radially expanding an internal fitted tube.

2. Description of the Prior Art

The prior art of metalworking has known many types of tube and fitting assemblies wherein a tube and fitting are joined without the aid of threads, nuts, and the like. Generally, the tube or fitting is deformed or swaged to seal the tube to the fitting.

In many cases, the swaging or deformation process causes a cold welding of the tube and fitting due to the extremely high pressures exerted between the tube and fitting. Cold welding was generally accomplished on softer materials such as aluminum and the like. One disadvantage of cold welding is that the weld only takes place when the materials were freshly cut or prepared. If aluminum parts were stored for any substantial period of time then no cold weld would form due to aluminum oxide on the surface.

The prior art has joined tube and fitting assemblies by inserting a tube into a fitting and using a flaring tool to expand the tubing wall to engage the fitting. For example, a fitting bore may have a recess wherein the tubing wall is radially expanded by a flaring tool to engage the bore recess to form a seal between the tube and the fitting. This process was suitable for larger tubings but was impractical for small tubings where a flaring tool cannot be easily inserted.

The prior art has used a ring stake process to join a small tube to a fitting. The ring stake process incorporates a fitting having a single bore substantially the same diameter as the tube. The tube is inserted into the bore and a die swages an outside surface of the fitting surrounding the bore to cause a deformation of the fitting to engage the tubing wall. This process did not require any internal flaring tool and provided a satisfactory low-pressure seal so long as no torsional strain was applied between the tube and the fitting. However, the seal could be destroyed if a torque was applied between the tube and the fitting about the axis of the tube. Consequently, the ring stake tube fitting assembly proved unreliable for many applications.

Therefore, an object of this invention is to provide a tube fitting assembly which requires no cold welding.

Another object of this invention is to provide a tube fitting assembly which requires no internal flaring tools.

Another object of this invention is to provide a tube fitting assembly which can be formed in a one-step operation.

Another object of this invention is to provide a tube fitting assembly which has a high torsional strength.

Another object of this invention is to provide a tube fitting assembly which is capable of high pressure sealing.

Another object of this invention is to provide a tube fitting assembly which is reliable.

SUMMARY OF THE INVENTION

The invention may be incorporated in a tube fitting assembly comprising in combination: a fitting having a first orifice through at least a portion of said fitting, said fitting having a second orifice through a portion of said first orifice; a tubing occupying said first and second orifices and having a first deformed portion of the tubing wall engaging one of said first and second orifices, and said tubing having a second deformed portion of said tubing wall engaging said outside surface of said fitting about said one of said orifices.

Other objects and a fuller understanding of the invention may be had by referring to the following description and claims, taken in conjunction with the accompanying drawings.

BRIEF DESCRIPTION OF THE DRAWINGS

FIG. 1 is a longitudinal sectional view of the prior art ring stake tube fitting assembly;

FIG. 2 is a longitudinal sectional view of a novel tube fitting assembly and which is the preferred embodiment; and, FIGS. 3–6 illustrate a method of forming the tube fitting assembly shown in FIG. 2.

DESCRIPTION OF THE PREFERRED EMBODIMENT

FIG. 1 is a longitudinal sectional view of a prior art tube fitting assembly comprising a fitting 10 and a tube 11 formed in a ring stake configuration. The fitting 10 comprises a body 13 shown as cylindrical but may be hexagonal or the like and a cylindrical tip 14 having threads 15. The cylindrical tip 14 has an internal aperture 17 concentric with the axis of the cylindrical tip 14 whereas the body 13 has a bore 18 concentric with the axis of the cylindrical tip 14. The fitting may be mounted by the threads 15 to direct a flammable gas through aperture 17 in a vertical direction to form a pilot light burner for a gas appliance.

The tube 11 is substantially the same diameter as the bore 18 and is inserted therein to have a tubing end 19 engage an inside surface 20 defined by the end of the bore 18. The tube 11 is sealed to the fitting 10 by deforming the fitting 10 in a manner commonly referred to as ring staking. In ring staking, an annular ring concentric with the axis of the tip 14 is struck against an outside surface 26 of the fitting 10 surrounding the bore 18. The ring staking causes deformation of the bore 18 of fitting 10 to form a projection 27 which engages the tube wall of the tube 11. The projection 27 makes a low-pressure, gas-tight, seal between the tube 11 and the fitting 10.

One disadvantage of this prior art design is the limited torsional strength of the tube 11 relative to the fitting 10. A rotation of the tube 11 relative to the fitting 10 will destroy the seal at projection 27. The ring stake provides sufficient longitudinal strength between the tube 11 and fitting 10, but is deficient relative to torque exerted on the tubing. Any rotation between the tube 11 and the fitting 10 will destroy the seal. The ring stake assembly has been widely used in the art irrespective of the aforementioned disadvantages because it was the most economical pressure seal between a small tubing and a fitting. This invention has solved the aforementioned disadvantages of the ring stake assembly by providing a novel tube and fitting assembly shown in FIGS. 2–6.

FIG. 2 is a longitudinal sectional view of the tubing joint or tube fitting invention. The assembly comprises a fitting or tubular part 30 and a tubing 31. The fitting 30 has a body 33 shown as a cylinder and a cylindrical tip 34 coaxial with axis 32. The tip 34 has mounting threads 35 and a coaxial aperture 37. The body 33 has a first coaxial bore or inner wall 38 extending through a first portion of the fitting 30. The bore 38 defines an internal surface 40 of the fitting 30 at the end of the bore. A second coaxial bore 41 extends through a portion of the first bore 38. A first shoulder 43 is formed at the junction of the first and second bores 38 and 41. The fitting 30 has an outside surface 45 surrounding the second bore 41.

The tube 31 is substantially equal in diameter to the bore 38 and engages the first bore 38 with a tubing end 47 contacting the inside surface 40 of the fitting. The tubing wall has a first deformed portion 51 wherein the tubing wall is radially expanded about the axis of the tube to engage the first shoulder 43 and the region between the first and second bores 38 and 41. The first deformed portion 51 also engages the second bore 41 to completely fill the first and second bores except for the central opening of the tube 31. The assembly has a second deformed portion 52 which engages a second shoulder 53 formed between the outside surface 45 of the fitting 33 and the second bore 41. The second deformed portion 52 engages the outside surface 45 surrounding the second bore 41. In the prior art ring stake shown in FIG. 1, the fitting 10 is deformed to engage the tube 11. In the present invention illustrated in FIG. 2, the tubing wall is deformed to engage the fitting 30. Whereas the prior art ring stake had only a single annular projection 27 to secure the tube 11 to the fitting 10, the present invention has several areas of engagement between the tube 31 and the fitting 30. The tube 31 engages the fitting 30 at the internal surface 40, the first bore 38, the first shoulder 43, and the region between the first and second bores, the second bore 41, the second shoulder 53, and the outside surface 45. Deformation of the tubing wall of the tubing 31 at each of these areas provide a seal which is many times more effective than the prior art ring stake.

In experimental tests on one-eighth inch O.D. aluminum tubing for making gas pilot burners, consistent tube fitting assemblies were made which are pressure tested at 100 pounds per square inch (p.s.i.) whereas the manufacturer's specifications for such a fitting require only one pound per square inch. In addition, the mechanical strength of this fitting has been demonstrated in that if the tube 31 is twisted about the tube axis one inch from the fitting 30, the tube 31 will break after several rotations prior to breaking the seal. The invention provides a tube fitting assembly where the seal between the tube and the fitting is stronger than the tube. The aforementioned pressure and mechanical strength of this novel tube fitting assembly is a substantial contribution to the tube fitting art. The assembly enhances the safety of gas appliances due to the 100 to 1 pressure safety factor and a mechanical seal which is stronger than the tubing itself.

The invention has been set forth as a tube fitting assembly comprising a fitting 30 having a first orifice shown as a bore 38 which may be tapered or curved and extending through at least a portion of the fitting. The fitting has a second orifice shown as a second bore 41 which may also be tapered or curved and through a portion of the first orifice. The assembly includes a tubing 31 occupying the first and second orifices 38 and 41 and having a first deformed portion 51 of the tubing wall engaging one of the first and second orifices 38 and 41. A second deformed portion 52 of the tube wall engages an outside surface 45 of the fitting 30 surrounding one of the first and second orifices 38 and 41. In FIG. 2, the second orifice or bore has a larger cross-sectional area than the first bore. It is apparent that the first and second orifices and tubing may have a cross-sectional shape of a polygon and need not necessarily have a circular cross-sectional shape. Likewise, the embodiment illustrates a simplified arrangement wherein the aperture 37, the first bore 38, and the second bore 41 are coaxial with one another with the tubing 31 being substantially equal in diameter to the first bore 38. These simplified modifications need not necessarily be applied to practice this invention. The deformed portions of the tubing wall need not necessarily be radially expanded but may be contracted along a tapered or curved orifice and/or an expansion about another orifice.

The method of forming the tube fitting assembly requires the fitting to have a first orifice 38 through at least a portion of the fitting and a second orifice 41 through a portion of the first orifice 38. The fitting has an outside surface 45 surrounding the second orifice 41. The method of forming the assembly comprises the steps of holding the fitting by a holding die 60 and holding the tubing 31 by a holding die 61. The holding die 61 holds the tube 31 at a distance from the tube end 47 which is greater than the length of the first bore 38. The first bore 38 includes the distance from the outside surface 45 to the inside surface 40 of the fitting 30. This greater length is required due to the contraction of length of the tube 31 to form the enlargement of the tubing wall to engage with the fitting. The method includes inserting the tubing 31 into the first orifice 38 as shown in FIG. 4, to abut the internal surface 40 of the fitting. The process requires relatively moving the tubing 31 and the fitting 30 to deform the tubing wall into engagement with one of the orifices and to be extended outwardly from the fitting. This step is illustrated in FIG. 5 wherein the relative movement of the tube radially expands the tubing wall to form a bead or extended portion 65 and engages the second bore 41 and extends outwardly from the fitting 30. The radial expansion of the tubing wall engages substantially all of the first and second bores of the fitting 30. The final step of the method is shown in FIG. 6 and includes forcing the tube extended portion 65 into engagement with the outside surface 45 of the fitting to form the second deformed portion 52. This step is accomplished by swaging with the front surface 66 of the die 61. Although the invention is illustrated as swaging the extended portion with the surface 66, another swaging tool may be applied to accomplish this final step.

The novel tube fitting assembly has been set forth in FIGS. 2-6. The advancement of this invention over the prior art can best be appreciated in view of the pressure-tightness and mechanical strength of the assembly. Much of this strength is attributed from present understanding to the second deformed portion 52. The assembly has a substantial increase in mechanical and pressure strength over the prior art even though requiring only a relatively small modification to the structure.

This invention has been perfected on 0.125 through 0.500 inch O.D. soft aluminum tubing having a 0.035 inch wall thickness. The first bore 38 has a diameter of a #25 drill, about 0.1495 inches. The first bore 38 has an approximate length from the outside surface 45 to the internal surface 40 of three-sixteenths of an inch and may be made with a #30 drill leaving a tapered internal surface 40. The second bore 41 has an approximate length from the outside surface 45 to the first shoulder 43 of 1/32 of an inch. The tubing 31 is grasped by the die 61 spaced from the tubing end 47 at a distance of 1/16 of an inch greater than the length of the first bore from the outside surface 45 to the internal surface 40. This extra 1/16 of an inch is used to fill the first and second bores and engage with the outside surface 45 of the fitting 30. The head portion 65 of the tubing wall shown in FIG. 5 will have a length from the front surface 66 of die 61 to the first shoulder 43 of approximately 0.040 inches with approximately 0.015 inches extending between the outside surface 45 and the front surface 66 of die 61. This excess material will be forced by the front surface 66 of die 61 to establish the second deformed portion 52 in swaging engagement with the outside surface 45 of the fitting 30. Fittings made in accordance with the above specifications have been tested to 100 pounds per square inch with no detectable leaks. Such fittings as required by the gas appliance manufacturing industry requires a one pound leak test.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts and materials thereof may be resorted to without departing from the spirit and the scope of the invention as hereinafter claimed.

What is claimed is:

1. A tube fitting assembly comprising in combination:
   a fitting having a first wall defining a first orifice through at least a portion of said fitting,
   said fitting having a second wall defining a second orifice through a portion of said first orifice and being larger in cross section than said first orifice and said larger cross section extending to an outside surface of said fitting,
   a tubing having an internal passage and having a first portion engaging said first wall and occupying substantially all of said first orifice and having a first longitudinally compressed and radially expanded tubing portion engaging said second wall and occupying substantially all of said second orifice radially outwardly from said internal passage of said tubing,
   said radially expanded tubing portion being worked to flow radially into engagement with substantially all of said second wall whereby the tubing wall thickness is increased yet retains a substantially constant inner wall diameter,
   retention means longitudinally retaining said tubing within said fitting and including said radially expanded tubing portion engaging said fitting,
   and said tubing having a deformed portion of said tubing engaging said outside surface of said fitting about said second orifice.

2. A tube fitting assembly comprising in combination:
   a fitting having a first wall defining a first orifice through at least a portion of said fitting,
   said fitting having a second wall defining a second orifice through a portion of said first orifice with said second orifice having a larger orifice cross-sectional area than said first orifice and said larger cross-sectional area extending to an outside surface of said fitting,
   a tubing having an internal diameter and having a first portion engaging said first wall and occupying substantially all of said first orifice and having a first longitudinally compressed and radially expanded tubing portion engaging said second wall,
   said radially expanded tubing portion being worked to flow radially into engagement with substantially all of said second wall whereby the tubing wall thickness is increased yet retains a substantially constant inner wall diameter,
   retention means longitudinally retaining said tubing within said fitting and including said radially expanded tubing portion engaging said fitting,
   and said tubing having a second radially expanded portion of said tubing engaging said outside surface of said fitting surrounding said second orifice.

3. A tube fitting assembly as set forth in claim 2 wherein said tubing has a tubing end abutting said fitting.

4. A tube fitting assembly as set forth in claim 2 wherein said first and second orifices are located along a common line.

5. A tube fitting assembly comprising in combination:
   a fitting having an aperture,
   said fitting having a first wall defining a first orifice communicating with said aperture and through at least a portion of said fitting and having an abutment surface of said fitting at a position along said first orifice,
   said fitting having a second wall defining a second orifice substantially coaxial with and through at least a portion of said first orifice,
   said fitting having an outside surface surrounding said second orifice,
   said second orifice having a greater cross-sectional area than said first orifice,
   a tubing having an outer cross-sectional area substantially equal to said first orifice and having a passage within said tubing,
   said tubing engaging said abutment surface of said fitting,
   said tubing engaging said first wall,
   said tubing having a first longitudinally compressed and radially expanded portion of the tubing engaging substantially all of said second wall,
   said radially expanded tubing portion being worked to flow radially into engagement with substantially all of said second wall whereby the tubing wall thickness is increased yet retains a substantially constant inner wall diameter,
   retention means longitudinally retaining said tubing within said fitting and including said radially expanded tubing portion engaging said fitting,
   and said tubing having a second radially expanded portion of said tubing engaging said outside surface of said fitting.

6. A tube fitting assembly as set forth in claim 5, wherein:
   a first shoulder is formed between said first and second orifices,
   a second shoulder is formed between said second orifice and said outside surface,
   said first radially expanded portion engaging said first shoulder, and said second radially expanded portion engaging said second shoulder.

7. A tube fitting assembly comprising in combination:
a fitting having an aperture and an outside surface,
said fitting having a first bore communicating with and through at least a portion of said aperture and defining an inside surface of said fitting at one end of said first bore,
said fitting having a second bore concentric with and through at least a portion of said first bore and extending to said outside surface of said fitting,
said second bore having a greater diameter than said first bore and forming a shoulder between said first and second bores,
a tubing having an outside diameter substantially equal to said first bore and having an inside diameter,
said tubing being located within said first bore with an end of said tubing engaging said inside surface of said fitting,
said tubing having a first longitudinally compressed and radially expanded portion of the tubing wall engaging and occupying substantially all of said first bore,
said tubing having a second radially expanded portion of said tubing wall engaging said second bore to form a seal between said tubing and said second bore and said shoulder,
said second radially expanded tubing portion being worked to flow radially into engagement with substantially all of said second bore whereby the tubing wall thickness is increased yet retains a substantially constant inside diameter,
and retention means longitudinally retaining said tubing within said fitting and including said first and second radially expanded portions engaging the walls forming said first and second bores, respectively.

8. A tube fitting assembly comprising in combination:
a fitting having an aperture and an outside surface,
said fitting having a first cylindrical bore communicating with and through at least a portion of said aperture and defining an inside surface of said fitting at one end of said first bore,
said fitting having a second cylindrical bore concentric with and through at least a portion of said first bore and extending to said outside surface of said fitting,
said second bore having a greater diameter than said first bore and forming a shoulder between said first and second bores,
a tubing having an outside diameter substantially equal to said first bore and having an inside diameter,
said tubing being located within said first bore with an end of said tubing engaging said inside surface of said fitting,
said tubing having a first longitudinally compressed and radially expanded deformed portion of the tubing wall engaging said first bore,
said tubing having a second radially expanded deformed portion of said tubing wall engaging said second bore whereby the deformed portions occupy substantially all of the space of said first and second bores beyond said inside diameter of said tubing to form a seal between said tubing and said first and second bores and said shoulder,
said second radially expanded tubing portion being worked to flow radially into engagement with substantially all of said second bore whereby the tubing wall thickness is increased yet retains a substantially constant inside diameter,
and retention means longitudinally retaining said tubing within said fitting and including said first and second radially expanded portions engaging the walls forming said first and second bores, respectively.

9. A tubing joint comprising, in combination,
a tubular part having an inner wall and a first portion near one end thereof,
a tube having an outer wall and an inner wall,
said tube having a main body and having an end portion,
means establishing an inside surface fixed relative to said tubular part and of a radius smaller than the radius of the outer wall of said tube,
means establishing a first shoulder on said first portion of said tubular part closer to said one end of said tubular part than said inside surface,
each said shoulder and said inside surface being transverse to the axis of said tube,
said inner wall of said tubular part first portion being substantially cylindrical and having a diameter slightly larger than the nominal diameter of the outer wall of said tube main body,
said tube end portion being telescoped inside said first portion of said tubular part with the end portion of said tube abutting said inside surface,
at least a first annular area on said tube wall being bulged outwardly and forming a radially enlarged annular bead on the outer wall of said tube,
fluid seal means acting between said annular bead and one of said shoulder and inside surface, and
said radially enlarged annular bead being worked to flow radially into engagement with a portion of said tubular part whereby the tubing wall thickness is increased yet retains a substantially constant inner wall diameter.

10. A tubing joint as set forth in claim 9, including an enlarged area in said tubular part adjacent said first shoulder and being enlarged relative to said first portion,
and said annular bead being disposed inside said enlarged area.

11. A tubing joint as set forth in claim 10, wherein said fluid seal means includes said annular bead engaging an annular portion of said enlarged area.

12. A tubing joint as set forth in claim 10, including retention means longitudinally retaining said tube in said tubular part,
said retention means including said annular bead being radially restrained by said enlarged area.

13. A tubing joint as set forth in claim 10, wherein said annular bead is a substantially solid annular mass filling the space between said enlarged area and said inner wall diameter.

14. A tubing joint as set forth in claim 9, wherein said seal means includes the radial expansion of said tube end portion to be larger in diameter than said tube main body and engaging said tubular part inner wall.

* * * * *